(12) United States Patent
Anunciacao et al.

(10) Patent No.: US 12,211,048 B2
(45) Date of Patent: Jan. 28, 2025

(54) METHOD, APPARATUS AND COMPUTER PROGRAMS FOR GENERATING A MACHINE-LEARNING SYSTEM AND FOR CLASSIFYING A TRANSACTION AS EITHER FRAUDULENT OR GENUINE

(71) Applicant: Sony Corporation, Tokyo (JP)

(72) Inventors: Orlando Anunciacao, Stuttgart (DE); Francesco Cartella, Stuttgart (DE); Olivier Elshocht, Stuttgart (DE); Francisco Fatore, Stuttgart (DE); Barbara Jochems, Stuttgart (DE); Erbin Lim, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 1266 days.

(21) Appl. No.: 16/810,878

(22) Filed: Mar. 6, 2020

(65) Prior Publication Data
US 2020/0286095 A1 Sep. 10, 2020

(30) Foreign Application Priority Data
Mar. 7, 2019 (EP) .................................... 19161428

(51) Int. Cl.
*G06Q 20/40* (2012.01)
*G06F 18/23* (2023.01)
(Continued)

(52) U.S. Cl.
CPC ......... *G06Q 20/4016* (2013.01); *G06F 18/23* (2023.01); *G06F 18/231* (2023.01); *G06F 18/23213* (2023.01); *G06N 20/00* (2019.01)

(58) Field of Classification Search
CPC ... G06Q 20/4016; G06F 18/23; G06F 18/231; G06F 18/23213; G06F 18/245; G06N 20/00
See application file for complete search history.

(56) References Cited

U.S. PATENT DOCUMENTS

| 7,792,770 B1 | 9/2010 | Phoha et al. |
| 8,762,379 B2 * | 6/2014 | Birdwell ............. G06F 16/2453 |
| | | 707/737 |

(Continued)

OTHER PUBLICATIONS

Pat Langley, Jaime G. Carbonell, Approaches To Machine Learning, Feb. 16, 1984, Department of Computer Science, Carnegie Mellon University, pp. 1-16 (Year: 1984).*

(Continued)

*Primary Examiner* — E Carvalho
(74) *Attorney, Agent, or Firm* — XSENSUS LLP

(57) ABSTRACT

Embodiments of the present disclosure relate to a method, an apparatus and a computer program for providing a machine-learning system to be used for classifying transactions as either fraudulent or genuine, and a method, an apparatus and a computer program for classifying transactions as either fraudulent or genuine. The method for generating a machine-learning system for classifying transactions as either fraudulent or genuine based on a plurality of training transactions, each training transaction being associated with labelling information that indicates whether the training transaction is either genuine or fraudulent, comprises clustering the plurality of training transactions into a plurality of clusters based on a similarity measure. The method comprises determining, for each of the plurality of clusters, whether the cluster is homogeneous or heterogeneous. A heterogeneous cluster includes both fraudulent and genuine training transactions. A homogeneous cluster includes either only fraudulent or only genuine training transactions. The method comprises, for each of the heterogeneous clusters, training an associated machine-learning model using the training transactions belonging to the respective heterogeneous cluster.

14 Claims, 3 Drawing Sheets

(51) Int. Cl.
*G06F 18/231* (2023.01)
*G06F 18/23213* (2023.01)
*G06N 20/00* (2019.01)

(56) References Cited

U.S. PATENT DOCUMENTS

| | | |
|---|---|---|
| 2007/0106582 A1* | 5/2007 | Baker .................... G06Q 40/00 |
| | | 705/35 |
| 2014/0058763 A1 | 2/2014 | Zizzamia et al. |
| 2014/0143186 A1 | 5/2014 | Bala |
| 2018/0150724 A1 | 5/2018 | Brock |
| 2018/0225593 A1* | 8/2018 | Cozine ............... G06Q 30/0278 |
| 2018/0285996 A1* | 10/2018 | Ma ........................ H04L 9/0637 |
| 2019/0236608 A1* | 8/2019 | Formsma ................. G06N 7/01 |
| 2021/0217014 A1* | 7/2021 | Shetty ............... G06Q 20/4014 |

OTHER PUBLICATIONS

Andrei Sorin Sabau, Survey of Clustering based Financial Fraud Detection Research, 2012, Informatica Economica, vol. 16, pp. 110-122 (Year: 2012).*

* cited by examiner

METHOD, APPARATUS AND COMPUTER PROGRAMS FOR GENERATING A MACHINE-LEARNING SYSTEM AND FOR CLASSIFYING A TRANSACTION AS EITHER FRAUDULENT OR GENUINE

CROSS-REFERENCE TO RELATED APPLICATION

The present application claims priority to European Patent Application 19161428.8 filed by the European Patent Office on Mar. 7, 2019, the entire contents of which being incorporated herein by reference.

FIELD

The present disclosure generally relates to a creation and use of a machine-learning system, the machine-learning system being suitable for a classification of transactions as either fraudulent or genuine.

BACKGROUND

Fraud Detection Systems are essential tools that organizations like banks, insurances and credit institutions use to protect themselves from fraudulent activities performed by malicious users. These systems usually work by automatically analyzing transaction logs and raising alarms whenever a transactional activity is deemed to be suspicious, according to a predefined logic. Traditional Fraud Detection Systems usually implement the detection logic in a rule-based manner. In other words, conditions designed to target known fraud scenarios may be set a priori by the business (for instance on transaction amount, transaction frequency or payment location) and whenever these conditions are violated, a suspicious activity may be reported. The response to these alarms may depend on the business context and can be the rejection of the transaction or further investigation of the suspicious activities.

Other than requiring a deep understanding of fraud mechanisms that are often unknown and unpredictable, rule based systems might also be vulnerable and exposed to reverse engineering techniques. Using these techniques, malicious users might be able to infer the underlying detection logic and take targeted counteractions to induce the system to fail in reporting fraudulent transactions.

On the other hand, in the current digital era characterized by an exponentially-growing availability of data, cheap computing power and storage, Machine Learning and Artificial Intelligence techniques have been increasingly and successfully adopted at the core of many modern fraud detection systems, due to their effectiveness in automatically discovering fraud dynamics in the data and, more importantly, due to their capability to quickly adapt to new fraud patterns.

In practice, given a training set of historical transactions for which it is known whether they are fraudulent or not, machine-learning algorithms may be able to capture and model the complex relations between the attributes of the input transactions. The output may be a mathematical function that may be used to infer the propensity of future transactions to be fraud, according to the values of their attributes.

One of the main issues of machine learning algorithms applied to fraud detection is that, typically, fraudulent events are extremely rare if compared to genuine transactions. Moreover, fraud detection models are commonly trained using the entire dataset, resulting in a single discriminative model that classifies new transactions either as fraud or not fraud. Consequently, the training procedure is often performed on the entire training data, resulting in a very slow procedure, especially when a big volume of observations is available. Furthermore, the produced supervised model may have to determine what useful discriminative information is, by analyzing all the training instances, including those that are clearly and easily classifiable as not fraud (which, in a typical fraud detection setting, are the majority). As a consequence, the generated models often are very general and typically prone to false positives and false negative classifications.

SUMMARY

It is an object of the present disclosure to provide a method, an apparatus and a computer program for providing a machine-learning system to be used for classifying transactions as either fraudulent or genuine, and to provide a method, an apparatus and a computer program for classifying transactions as either fraudulent or genuine that use fewer resources.

Embodiments of the present disclosure provide a method for generating a machine-learning system for classifying transactions as either fraudulent or genuine based on a plurality of training transactions. Each training transaction is associated with labelling information that indicates whether the training transaction is either genuine or fraudulent. The method comprises clustering the plurality of training transactions into a plurality of clusters based on a similarity measure. The method comprises determining, for each of the plurality of clusters, whether the cluster is homogeneous or heterogeneous. A heterogeneous cluster includes both fraudulent and genuine training transactions. A homogeneous cluster includes either only fraudulent or only genuine training transactions. The method comprises, for each of the heterogeneous clusters, training an associated machine-learning model using the training transactions belonging to the respective heterogeneous cluster.

Embodiments of the present disclosure provide a method for classifying a transaction as either fraudulent or genuine. The method comprises assigning the transaction to a cluster of a plurality of clusters in accordance with a similarity measure. The plurality of clusters are each based on a plurality of training transactions in accordance with the similarity measure. Each training transaction is associated with labelling information that indicates whether the training transaction is either genuine or fraudulent. The method comprises classifying the transaction as either fraudulent or genuine by using a machine-learning model that has been trained based on the training transactions of the cluster the transaction is assigned to if the cluster the transaction is assigned to is heterogeneous. A heterogeneous cluster includes both fraudulent and genuine training transactions. The method comprises classifying the transaction as either fraudulent or genuine by using the labelling information of the training transactions of the cluster the transaction is assigned to otherwise.

Embodiments of the present disclosure provide a method for classifying a transaction as either fraudulent or genuine using a machine-learning system generated using the method for generating a machine-learning system. The method comprises assigning the transaction to the closest cluster in accordance with the similarity measure. The method comprises, if the cluster to which the transaction is assigned is homogeneous, classifying the transaction in accordance with the labelling information of the training transactions of the cluster. The method comprises, if the cluster to which the transaction is assigned is heterogeneous, classifying the transaction by means of the machine-learning model associated with the cluster.

Embodiments of the present disclosure provide a computer program having a program code for performing at least one of the methods when the computer program is executed on a computer, a processor, or a programmable hardware component.

Embodiments of the present disclosure provide an apparatus comprising circuitry. The circuitry is configured to execute at least one of the methods.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
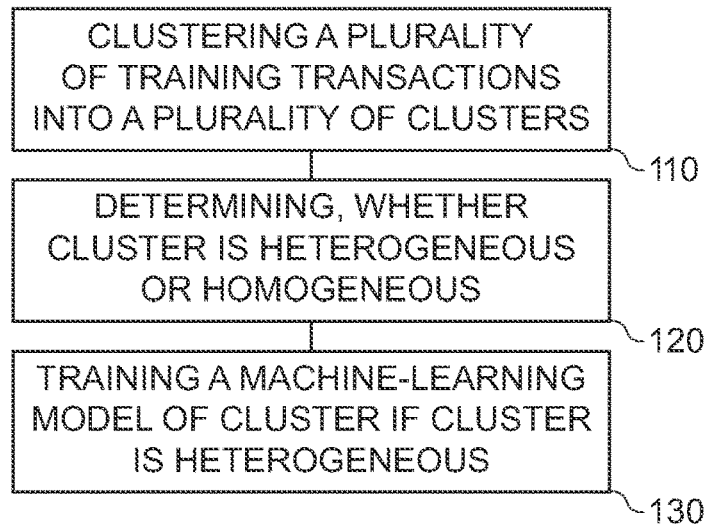
FIGS. 1a and 1b show flow charts of embodiments of a method for generating a machine-learning system.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

At least some embodiments of the present disclosure provide a two stage training procedure, where unsupervised clustering which identifies groups of transactions having similar attributes is performed prior to a supervised learning of multiple high specialized models, trained (only) on the sub-groups of transactions belonging to heterogeneous clusters (groups having both fraud and not fraud transactions). The rationale is that transactions out of groups of heterogeneous transactions are more difficult to classify due to their similarity. Hence, distinct supervised models trained on each heterogeneous cluster may specialize to distinguish subtle differences and obtain better performances.

Prediction (i.e. classification) may also be performed in two stages, by first assigning the new instance (i.e. transaction) to be classified to its closest cluster. The second stage might be executed (only) if the instance belongs to a heterogeneous cluster, in which case the classification may be performed by the corresponding model trained on that subgroup. Otherwise, the new sample may be labeled according to the class the homogeneous cluster belongs to (e.g. fraudulent or genuine). Thus, at least some embodiments further provide a two stage classification procedure.

At least some embodiments of the present disclosure aim at obtaining a nimble training/classification procedure that, by combining the advantages of unsupervised and supervised learning, is designed to classify the majority of easily classifiable transactions without using complex machine-learning models, reserving the usage of complex models (only) for instances that are difficult to classify. Moreover, the training time may be considerably reduced, as (only) clustering, which is typically much faster than supervised model training, might be performed on the entire training set. On the other hand, supervised learning might be run (only) on a few smaller sub groups of transactions. As the supervised learning is performed on disjoint sub groups of heterogeneous transactions, the algorithm may be easily run in a distributed way and, potentially, on a network of small devices with limited computing power.

Figure 1B:
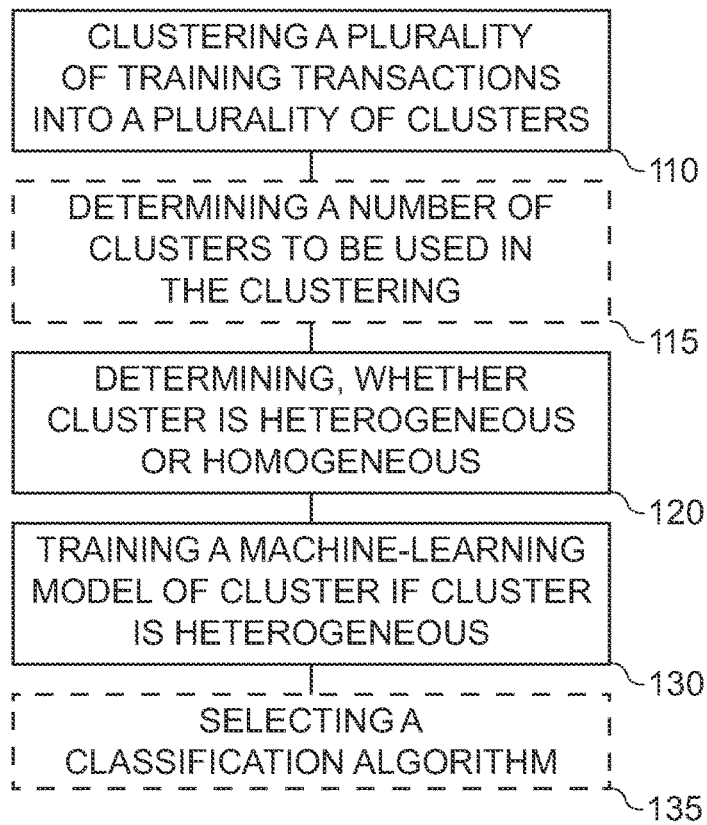

FIGS. 1a and 1b show flow charts of embodiments of a method for generating a machine-learning system. The machine-learning system is suitable for classifying transactions as either fraudulent or genuine based on a plurality of training transactions. Each training transaction is associated with labelling information that indicates whether the training transaction is either genuine or fraudulent. The method comprises clustering 110 the plurality of training transactions into a plurality of clusters based on a similarity measure. The method comprises determining 120, for each of the plurality of clusters, whether the cluster is homogeneous or heterogeneous. A heterogeneous cluster includes both fraudulent and genuine training transactions and a homogeneous cluster includes either only fraudulent or only genuine training transactions. The method comprises, for each of the heterogeneous clusters, training 130 an associated machine-learning model using the training transactions belonging to the respective heterogeneous cluster.

Figure 1C:
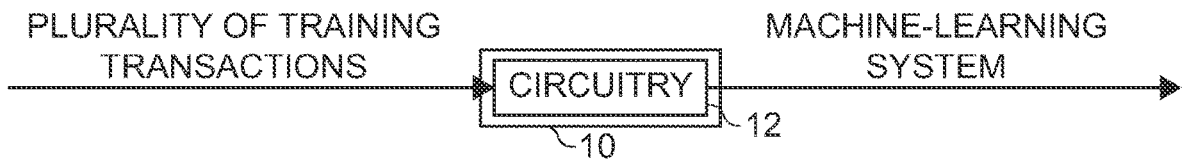
FIG. 1c shows a block diagram of an embodiment of an apparatus for generating a machine-learning system.

FIG. 1c shows a block diagram of an embodiment of an apparatus 10 for generating a machine-learning system. The apparatus 10 comprises circuitry 12 that is configured to execute the method introduced in connection with FIGS. 1a and/or 1b.

The following description relates to both the method of FIGS. 1a and/or 1b and to the apparatus 10 of FIG. 1c.

At least some embodiments of the present disclosure relate to a method, apparatus or computer program for generating a machine-learning system suitable for classifying transactions as either fraudulent or genuine based on a plurality of training transactions. Institutions, such as banks, insurances or merchants, often process a huge number of transactions every day, such as financial transactions (which may be processed by a bank or by a merchant) or insurance transactions (which may be processed by insurances). Accordingly, the plurality of transactions may be financial transactions or insurance transactions. As the number of transactions is so high that a manual check of every transactions is not feasible, such institutions often use automated systems to classify the transactions as either fraudulent (i.e. suspicious, illicit) or genuine (i.e. unsuspicious, licit). In the following, the terms fraudulent, illicit and suspicious may be used interchangeably, and the terms genuine, licit and unsuspicious may be used interchangeably. In some systems, a rule-based classification may be used, e.g. by comparing certain metrics of the transactions to a rulebook that is used to decide whether the transaction is fraudulent/suspicious or genuine/unsuspicious. Such rulebooks may be based on experience, but might be susceptible to being reverse-engineered by malicious actors.

In some other systems, machine learning-based approaches may be used. One issue with using a machine learning-based approach is the training of the machine-learning model of the machine learning-based approach: If a historical set of transactions is used for training the machine-learning model, this training set is often mostly composed of genuine transactions, often amounting to hundreds of thousands of training transactions. Building a machine-learning system using such a large training set may lead to a training phase that requires a lot of computing resources, while leading to a machine-learning model that is susceptible to false positives and false negatives. To speed up the training of the machine-learning model while enabling a higher accuracy of the classification, embodiments use a segmenting technique denoted "clustering" that clusters the plurality of training transactions into a plurality of clusters. The training transactions within each of the clusters are similar according to a similarity measure, while being dissimilar to training transactions from other clusters. In a subsequent classification of a transaction, the transaction is assigned to one of the clusters, and the training transactions of that cluster is then used to classify the transaction. If, after the clustering of the plurality of training transactions, a cluster is homogeneous, i.e. it comprises only fraudulent or only genuine transactions, a machine-learning model built upon such a cluster would be superfluous, as every training sample yields the same desired output. Instead, the labeling information of such clusters may be used directly. The case is different if the cluster is homogeneous, i.e. the cluster includes both fraudulent and genuine training transactions. In this case, a specialized machine-learning model may be trained using the training transactions of the cluster. This machine-learning model may subsequently be used in the classification of a transaction that is assigned to this cluster. Embodiments thus provide a machine-learning system for classifying transactions as either fraudulent or genuine. In embodiments, the machine-learning system comprises one or more machine-learning models that are each based on a (single) heterogeneous cluster of the plurality of clusters, and labeling information of the homogeneous clusters. The machine-learning system is suitable for classifying transactions as either fraudulent or genuine, e.g. by using the one or more machine-learning models for a classification of transactions that are assigned to a heterogeneous cluster, and by using the labeling information of the homogeneous clusters otherwise. In other words, the machine-learning system may be based on using the labeling information associated with the training transactions of the homogeneous clusters in the classification of the transactions.

Each training transaction is associated with labelling information that indicates whether the training transaction is either genuine or fraudulent. For example, each training transaction may be associated with a binary value indicating whether the training transaction is fraudulent or genuine. In some embodiments, the plurality of training transactions and the labeling information may be stored in a database. The plurality of training transactions may each be stored in one or more fields of a row/entry in the database, and the labeling information may be stored as an additional field in the same row, e.g. as binary value. Alternatively, the plurality of training transactions may each be provided as separate files, and the labeling information may be provided within the same file or may be indicated as part of the file name of the file.

The method comprises clustering 110 the plurality of training transactions into a plurality of clusters based on a similarity measure. For example, the plurality of clusters may be disjoint, i.e. each transaction of the plurality of transactions may be comprised in exactly one cluster of the plurality of clusters. Apart from supervised learning, unsupervised learning may be used in machine learning. In unsupervised learning, (only) input data might be supplied, and an unsupervised learning algorithm may be used to find structure in the input data, e.g. by grouping or clustering the input data, finding commonalities in the data. Clustering is the assignment of input data comprising a plurality of input values into subsets (clusters) so that input values within the same cluster are similar according to one or more (predefined) similarity criteria or similarity measures, while being dissimilar to input values that are included in other clusters. For example, the plurality of training transactions may be clustered 110 using an unsupervised clustering technique (i.e. using unsupervised learning). This may enable a fast and automated clustering of the training transactions. In at least some embodiments, the labeling information is disregarded in the clustering of the plurality of training transactions. Incorporating the training output may lead to less useful results, as no such information might be available in the subsequent classification of transactions.

In embodiments, the similarity measure may be defined by the unsupervised learning process. In many cases, the clustering of the plurality of training transactions is an iterative process, i.e. the plurality of training transactions may be processed one after another. Consequently, the similarity measure may develop during the clustering of the plurality of training transactions. For example, the similarity measure, and therefore the clustering, may be based on k-means clustering. k-means clustering aims to partition n observations (i.e. transactions) into k clusters (i.e. the plurality of clusters) in which each observation belongs to the cluster with the nearest mean, serving as a prototype of the cluster. In this case, the similarity measure may be defined by the distance of the transactions of the plurality of training transactions to a mean of the clusters of the plurality of clusters. Alternatively, the similarity measure, and therefore the clustering, may be based on hierarchical clustering. Hierarchical clustering is a method of cluster analysis that seeks to build a hierarchy of clusters. In hierarchical clustering, the plurality of transactions are either clustered using a "bottom-up" (agglomerative) approach, in which each transactions starts in its own cluster, and pairs of clusters are merged as the training algorithm moves up the hierarchy, or a "top-down" (divisive) approach, where all transactions start in one cluster, and splits are performed recursively as the training algorithm moves down the hierarchy. In this case, the similarity measure may be the measure that is used to define when pairs of clusters are merged (bottom-up approach) or that is used to define when a cluster is split (top-down approach). Both similarity measures may be used to implement the clustering of the training transactions.

In at least some embodiments, the clustering of the plurality of training transactions is performed using a (pre-defined) number of clusters. For example, the pre-defined number of clusters may be used as a parameter in the clustering of the plurality of training transactions. This number of clusters generated in the clustering of the plurality of training transactions may depend on the plurality of training transactions. In other words, as shown in FIG. 1b, the method may comprise determining 115 the number of clusters to be used in the clustering of the plurality of training transactions based on the plurality of training transactions. By determining the number of clusters, the variety of the retained information may be increased. For example, the number of clusters may be determined, e.g. before the clustering is performed, or by performing the clustering using different numbers of clusters and choosing the number of clusters that has improved properties compared to the other numbers of clusters.

For example, the number of clusters to be used in the clustering of the plurality of training transactions may be determined 115 using an iterative process that is performed over a range of numbers of clusters. For example, the clustering of the plurality of training transactions may be performed based on a plurality of different numbers of numbers of clusters comprised in the range of numbers of clusters. For example, the range of numbers of clusters may be set to 3 to 20 clusters. The clustering may be performed using the numbers comprised in the range of numbers of clusters (e.g. 3, 4, 5 . . . 20) as parameters, resulting in a plurality of results each comprising a plurality of clusters. For example, the range of numbers of clusters may comprise at least 3 (or at least 5) clusters and/or at most 30 (or at most 25, at most 20) clusters. The determining of the number of clusters may comprise evaluating the plurality of results, e.g. by comparing at least one property of the plurality clusters of the plurality of results. For example, the number of clusters to be used in the clustering of the plurality of training transactions may be determined 115 based on a trade-off between intra-cluster variance and inter-cluster variance of the clustering of the plurality of training transactions. Accordingly, the at least one property of the clusters to be compared may comprise the inter-cluster variance and/or the intra-cluster variance. After evaluating the plurality of results, the method may comprise selecting the result and the associated number of clusters for which the at least one property is improved compared to other results of the plurality of results. The selected result may yield the plurality of clusters.

The method comprises determining 120, for each of the plurality of clusters, whether the cluster is homogeneous or heterogeneous. A heterogeneous cluster includes both fraudulent and genuine training transactions. A homogeneous cluster includes either only fraudulent or only genuine training transactions. For example, an iterative approach may be used for determining whether a cluster is homogeneous or heterogeneous. For example, the method may comprise iteratively processing the training transactions assigned to the cluster. As long as the training transactions that have been processed are either all fraudulent or all genuine, the iterative processing may continue. If both fraudulent and genuine transactions have been processed, the processing may cease, yielding that the cluster is heterogeneous. If, after processing all of the training transactions, the training transactions are either all fraudulent or all genuine, the processing may yield that the cluster is homogeneous. In some embodiments, the determining, for each of the plurality of clusters, whether the cluster is homogeneous or heterogeneous, may be performed during the clustering of the plurality of training transactions, e.g. if k-means clustering is used. Otherwise, the determining, for each of the plurality of clusters, whether the cluster is homogeneous or heterogeneous, may be performed after the clustering of the plurality of training transactions.

The method comprises, for each of the heterogeneous clusters (and not for any of the homogeneous clusters), training 130 an associated machine-learning model using the training transactions belonging to the respective heterogeneous cluster. The associated models for each heterogeneous cluster may be selected in a model selection procedure in the classification of the transactions (e.g. as shown in connection with the methods of FIG. 2). For example, the associated machine-learning models may correspond to the one or more machine-learning models referenced above. For each of the homogeneous clusters, the machine-learning system might only comprise the (accumulated or summarized) labeling information of the training transactions of the respective clusters.

For example, the associated machine-learning models of the heterogeneous clusters may be trained using supervised learning. The associated machine-learning models of the heterogeneous clusters may each be based on a single heterogeneous cluster of the plurality of clusters. For example, the training instructions of the respective heterogeneous clusters may be used as training samples of the supervised learning, and the labeling information may be used as desired output of the supervised learning. In other words, training transactions of the respective heterogeneous cluster may be used as training samples and the associated labelling information may be used as desired output in the training of the associated machine-learning model. In some embodiments, the associated machine-learning models of the heterogeneous clusters may be trained based on a classification algorithm. For example, for each heterogeneous cluster, the training transactions of the cluster may be used as training samples, and the associated labeling information may be used as the limited set of values that is used as the training output. For example, extreme gradient boosting or deep learning may be used. Alternatively, the associated machine-learning models of the heterogeneous clusters may be trained based on a regression algorithm. In this case, for each heterogeneous cluster, the training transactions of the cluster may be used as training samples, and the indication whether the training transactions are fraudulent or genuine may define two numerical values that are used as training output. Alternatively, the associated machine-learning models of the heterogeneous clusters may be trained based on a similarity learning algorithm.

For example, each machine-learning model of the associated machine-learning models of the heterogeneous clusters (e.g. of the one or more machine-learning models) may be an artificial neural network (ANN). ANNs are systems that are inspired by biological neural networks, such as can be found in a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, each machine-learning model of the associated machine-learning models of the heterogeneous clusters (e.g. of the one or more machine-learning models) may be a support vector machine. Support vector machines (i.e. support vector networks) are supervised learning models with associated learning algorithms that may be used to analyze data, e.g. in classification or regression analysis. Support vector machines may be trained by providing an input with a plurality of training input values (samples) that belong to one of two categories. The support vector machine may be trained to assign a new input value to one of the two categories. Alternatively, each machine-learning model of the associated machine-learning models of the heterogeneous clusters (e.g. of the one or more machine-learning models) may be a Bayesian network, which is a probabilistic directed acyclic graphical model. A Bayesian network may represent a set of random variables and their conditional dependencies using a directed acyclic graph. Alternatively, the machine-learning models may be based on a genetic algorithm, which is a search algorithm and heuristic technique that mimics the process of natural selection.

The associated machine-learning models of the heterogeneous clusters are trained individually, i.e. the associated machine-learning models of the heterogeneous clusters are each be based on a single heterogeneous cluster of the plurality of clusters. This enables the training of the associated machine-learning models of the heterogeneous clusters in a distributed way, e.g. using a plurality of distributed compute nodes. In other words, the associated machine-learning models of the heterogeneous clusters may be trained using a plurality of distributed compute nodes. The plurality of distributed compute nodes may form a network of compute nodes. In some embodiments, the plurality of distributed compute nodes may be small devices with limited computing power.

In some embodiments, the method may comprise a model selection procedure. In other words, to further improve a performance of the machine-learning system, the machine-learning models (and the classification algorithms they are based on) to be used for the training of the associated models may be selected based on their performance, i.e. based on an evaluation of one or more performance metrics of different classification algorithms. In other words, an analysis may be performed that comprises a model selection procedure, where the performance of different classification algorithms are compared, to finally select the machine-learning model that performs the best. The method may comprise selecting 135, for one or more of the heterogeneous clusters, a classification algorithm by evaluating one or more performance metrics of different classification algorithms based on (or for) the training transactions of the one or more heterogeneous clusters. In other words, the method may comprise selecting 135 a classification algorithm for training the associated machine-learning models by evaluating one or more performance metrics of different classification algorithms. For example, a plurality of different classification algorithms (i.e. machine-learning algorithms) may be provided, such as deep learning (i.e. deep neural networks), extreme gradient boosting, support vector machines, or decision trees. The method may comprise training different machine-learning models using the different classification algorithms, e.g. by training a plurality of machine-learning models using a plurality of different classification algorithms using the training transactions of the same cluster. After training the different machine-learning models, the method may comprise determining the one or more performance metrics based on the different machine-learning models. For example, the one or more performance metrics may comprise a computation effort required for using the machine-learning model and/or a classification accuracy of the machine-learning model (using the training transactions of the cluster as input during the evaluation. After evaluation, a classification algorithm of the different classification algorithms may be selected based on the one or more performance metrics. The associated machine-learning models may be trained using the selected classification algorithm. In other words, the associated machine-learning models of the heterogeneous clusters may be based on the selected classification algorithm.

Machine-learning algorithms are usually based on a machine-learning model. In other words, the term "machine-learning algorithm" may denote a set of instructions that may be used to create, train or use a machine-learning model. In embodiments, classification algorithms such as deep learning, extreme gradient boosting, support vector machines, or decision trees may be used to train the associated machine-learning models. The term "machine-learning model" may denote a data structure and/or set of rules that represents the learned knowledge, e.g. based on the training performed by the machine-learning algorithm. In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

The circuitry 12 may comprise processing circuitry and interface circuitry. The circuitry 12, e.g. the processing circuitry, may be implemented using one or more processing units, one or more processing devices, any means for processing, such as a processor, a computer or a programmable hardware component being operable with accordingly adapted software. In other words, the described function of the processing circuitry may as well be implemented in software, which is then executed on one or more programmable hardware components. Such hardware components may comprise a general-purpose processor, a Digital Signal Processor (DSP), a micro-controller, etc. The interface circuitry may correspond to one or more inputs and/or outputs for receiving and/or transmitting information, which may be in digital (bit) values according to a specified code, within a module, between modules or between modules of different entities.

More details and aspects of the method and/or apparatus 10 are mentioned in connection with the proposed concept or one or more examples described above or below (e.g. FIGS. 2 to 3b). The method and/or apparatus 10 may comprise one or more additional optional features corresponding to one or more aspects of the proposed concept or one or more examples described above or below.

Figure 2:
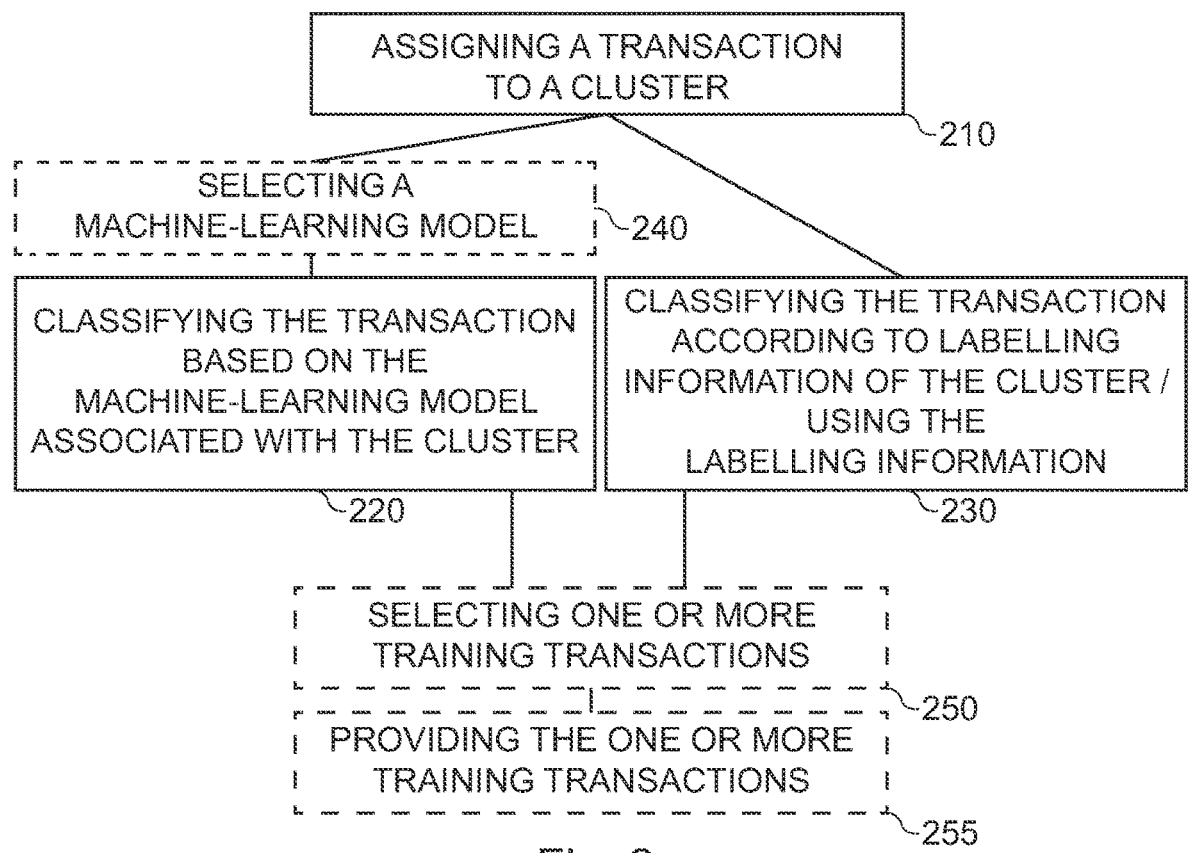
FIG. 2 shows a flow chart of a method for classifying a transaction as either fraudulent or genuine according to various embodiments.

FIG. 2 shows a flow chart of a method or of methods for classifying a transaction (e.g. a financial transaction or insurance transaction) as either fraudulent or genuine according to various embodiments. In a first wording, the method comprises assigning 210 the transaction to a cluster of a plurality of clusters in accordance with a similarity measure. The plurality of clusters are each based on a plurality of training transactions in accordance with the similarity measure. Each training transaction is associated with labelling information that indicates whether the training transaction is either genuine or fraudulent. The method comprises classifying 220 the transaction as either fraudulent or genuine by using a machine-learning model that has been trained based on the training transactions of the cluster the transaction is assigned to if the cluster the transaction is assigned to is heterogeneous. A heterogeneous cluster includes both fraudulent and genuine training transactions. The method comprises classifying the transaction as either fraudulent or genuine by using 230 the labelling information of the training transactions of the cluster the transaction is assigned to otherwise.

In other words, in a second wording of the method, the method is method for classifying a transaction as either fraudulent or genuine using a machine-learning system generated according to the method introduced in connection with FIGS. 1a and/or 1b. The method comprises assigning 210 the transaction to the closest cluster in accordance with the similarity measure. The method comprises, if the cluster to which the transaction is assigned is homogeneous, classifying 230b the transaction in accordance with the labelling information of the training transactions of the cluster. The method comprises, if the cluster to which the transaction is assigned is heterogeneous, classifying 220 the transaction by means of the machine-learning model associated with the cluster.

The method comprises assigning 210 the transaction to a cluster of a plurality of clusters in accordance with a similarity measure, e.g. the similarity measure introduced in connection with FIGS. 1a to 1c. For example, the transactions may be assigned to a cluster of a plurality of clusters that is most similar to the transaction according to the similarity measure, e.g. most similar to a numerical representation of the training transactions of the respective cluster. For example, the transaction may be assigned 210 to a cluster (of the plurality of clusters) based on a comparison of the transaction with a centroid or barycenter of the cluster. The centroid or barycenter of a cluster may be defined as an arithmetic or computational mean of (all of) the members (i.e. training transactions) of a cluster, e.g. based on a numerical representation of the training transactions within a cluster. This may assign the transaction to the cluster that is most similar to the transaction.

The method comprises classifying 220 the transaction as either fraudulent or genuine by using a machine-learning model that has been trained based on the training transactions of the cluster the transaction is assigned to if the cluster the transaction is assigned to is heterogeneous. In other words, and in conjunction with the concepts introduced in connection with FIGS. 1a to 1c, the method comprises, if the cluster to which the transaction is assigned is heterogeneous, classifying 220 the transaction by means of the machine-learning model associated with the cluster. For example, the machine-learning model that is associated with the cluster, e.g. that has been trained based on the training transactions of the cluster, may be trained using only training transactions of the cluster, e.g. using the method introduced in connection with FIGS. 1a and/or 1b. For example, the transaction may be classified 220 by providing the transaction as input to the machine-learning model associated with the cluster, and using the output of the machine-learning model as classification of the transaction. For example, the machine-learning model associated with the cluster may be trained based on a classification algorithm. The transaction may be provided as an input to the machine-learning model, and the output of the machine-learning model may indicate whether the transaction is classified as fraudulent (or suspicious) or genuine (or unsuspicious). Alternatively, the machine-learning model associated with the cluster may be trained based on a regression algorithm. The transaction may be provided as an input to the machine-learning model, and the output of the machine-learning model may provide a numerical value that represents a probability that the transaction is fraudulent (or genuine). Alternatively, the machine-learning model associated with the cluster may be trained based on a similarity learning algorithm. The transaction may be provided as an input to the machine-learning model, and the output of the machine-learning model may indicate a similarity between the provided transactions and fraudulent transactions and/or genuine transactions that the machine-learning model is trained on.

Before the transaction is classified, the appropriate machine-learning model (of the one or more machine-learning models) may be selected. In other words, the machine-learning model may be selected 240 for the classification of the transaction in a model selection procedure based on the cluster the transaction is assigned to if the cluster the transaction is assigned to is a heterogeneous cluster. For example, each heterogeneous cluster may be associated with a machine-learning model that has been trained using the training transactions that were clustered into the cluster. The associated machine-learning model may be selected 240 for the classification of the transaction in the model selection procedure. In at least some embodiments, the model-selection procedure is based on the assignment 210 of the transaction to the cluster.

The method comprises using 230 the labelling information of the training transactions of the cluster the transaction is assigned to otherwise, i.e. if the cluster to which the transaction is assigned to is homogeneous. In other words, the transaction may be classified 230 using the labelling information of the training transactions of the cluster the transaction is assigned to if the cluster to which the transaction is assigned is homogeneous. For example, if the cluster is homogeneous, the training transactions of the cluster are either all fraudulent or all genuine. If the transaction is assigned to a homogeneous cluster, the transaction may be classified as fraudulent if all of the training transactions of the cluster are fraudulent, and the transaction may be classified as genuine if all of the training transactions of the cluster are genuine. In both cases, the transaction may be classified as fraudulent or genuine without involving a machine-learning model if the cluster is homogenous.

After classification of the transaction as either fraudulent or genuine, the method may comprise providing the classification. For example, the classification may be provided as an entry in a transaction log, or as warning signal (e.g. if the transaction is classified as fraudulent). For example, in some embodiments, the classification might only be provided if the transaction is classified as fraudulent.

In some embodiments, the method comprises selecting 250 one or more training transactions from the cluster the transaction is assigned to using the similarity measure, and providing 255 the one or more training transactions with the classification of the transaction. For example, the one or more training transactions may be selected based on their similarity to the transactions to be classified. The one or more training transactions may be provided to illustrate or give context to the classification of the transaction.

More details and aspects of the method are mentioned in connection with the proposed concept or one or more examples described above or below (e.g. FIG. 1a to 1c, 3a to 3b). The method may comprise one or more additional optional features corresponding to one or more aspects of the proposed concept or one or more examples described above or below.

At least some embodiments of the present disclosure relate to a two stages semi-supervised fraud detection.

Various embodiments are based on the insight that, for a typical fraud detection task, the majority of instances is often easily identifiable as legitimate, while the biggest difficulty may lie in correctly capturing the fraudulent transactions. As such, if general profiles of licit activities is defined beforehand, the recognition of legitimate (i.e. genuine or unsuspicious) transactions may be simplified if their similarity measure with one of these profiles is big enough. On the other hand, a deeper analysis may be required to classify transactions that are highly dissimilar from a legitimate profile. Very rarely, it may also be possible to define clear fraud profiles. In these cases, the same conclusions as above may hold for the classification of fraud transactions.

Clustering methods are unsupervised learning techniques particularly suitable to define similarity groups and they have been extensively used to discover common patterns and underlying relations between entities, based only on their features.

Figure 3A:
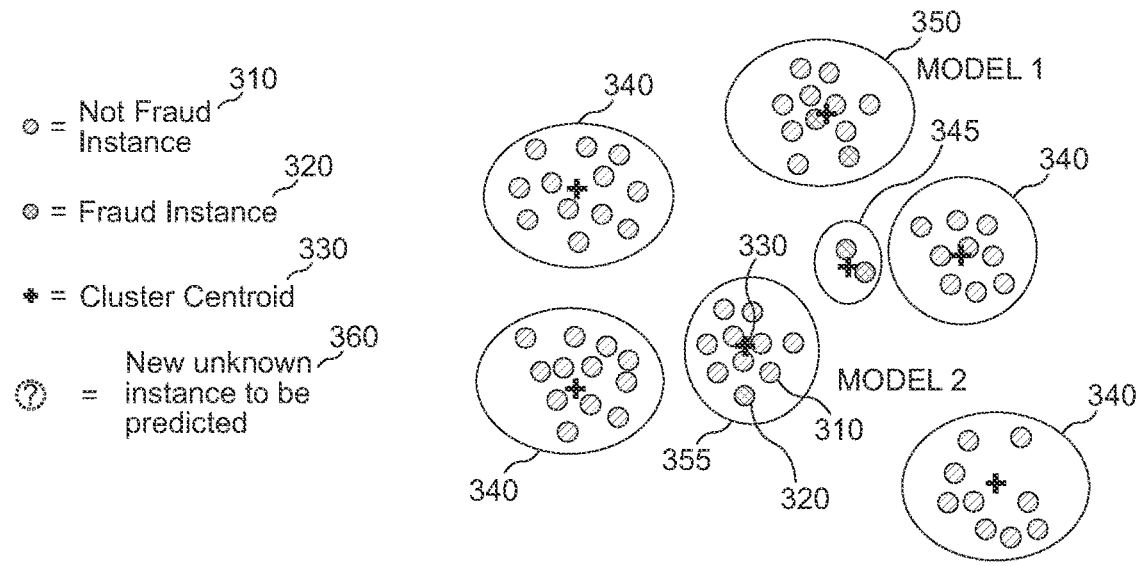
FIGS. 3a and 3b show a schematic illustration of a two stages training and prediction methodology.
Figure 3B:
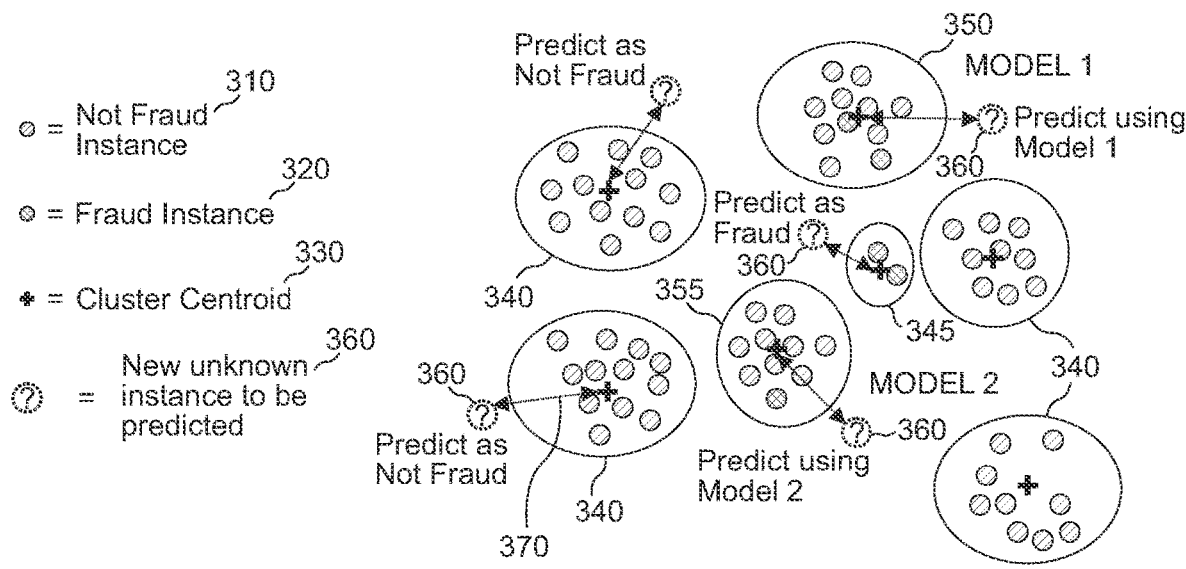

FIGS. 3a and 3b show a schematic illustration of a two stages training and prediction methodology. FIGS. 3a and 3b illustrate performing two stages for training and prediction.

In particular, for training
1. The first stage comprises running a clustering algorithm (e.g. clustering 110 the plurality of training transactions) on the entire training set (e.g. the plurality of training transactions), by using standard measures to determine the optimal number of clusters. This may lead to either homogeneous groups of transactions (containing either only frauds or only not frauds) or to heterogeneous groups (containing both fraud and not fraud transactions);
2. For each heterogeneous groups, supervised models may be trained (e.g. by training 130 the associated models), using (only) the transactions within the group as training set.

For prediction, given a new instance to be classified:
1. Assign the instance (i.e. the transaction) to the closest cluster;
2. If the cluster is homogeneous, assign the corresponding label (e.g. the labelling information) to the instance. Otherwise, run the instance through the model trained on that heterogeneous cluster (e.g. the associated model) and assign the produced score.

Systems running the proposed methodology may output the most common fraud and not fraud profiles whenever training is completed. On the other hand, at prediction time, a list of the top N similar transactions to the one that has been classified may be provided to the user. In this way, the methodology can provide also interpretability to its decisions.

Embodiments comprise or consist of a training/classification methodology particularly suitable to machine learning problems that are characterized by a strong unbalance between negative and positive instances of the population, like, for instance, fraud detection. As discussed above, clustering may initially be performed on the entire training set and, as such,
1. A clustering methodology (for instance k-means or hierarchical clustering)
2. A fitness measure to evaluate the optimal number of clusters (for instance inter and intra cluster variance tradeoff).

may be specified. For the second stage, a supervised learning technique may be specified. At this purpose, methodologies like extreme gradient boosting or deep learning, that have proven their effectiveness in various classification tasks, are particularly suitable.

Embodiments may aim at obtaining a paradigm to perform a faster and effective training, which may be potentially executed on distributed devices. Moreover, the another aim may be to provide a more nimble prediction procedure which is able to immediately classify the majority of negative sample which are easily recognizable, while delegating to more specialized supervised models the decision over difficult instances.

The aspects and features mentioned and described together with one or more of the previously detailed examples and figures, may as well be combined with one or more of the other examples in order to replace a like feature of the other example or in order to additionally introduce the feature to the other example.

The following examples pertain to further embodiments:
(1) A method for generating a machine-learning system for classifying transactions as either fraudulent or genuine based on a plurality of training transactions, each training transaction being associated with labelling information that indicates whether the training transaction is either genuine or fraudulent, the method comprising:
Clustering the plurality of training transactions into a plurality of clusters based on a similarity measure; and
Determining, for each of the plurality of clusters, whether the cluster is homogeneous or heterogeneous, a heterogeneous cluster including both fraudulent and genuine training transactions and a homogeneous cluster including either only fraudulent or only genuine training transactions; and
For each of the heterogeneous clusters, training an associated machine-learning model using the training transactions belonging to the respective heterogeneous cluster.
(2) The method according to (1), wherein the associated machine-learning models of the heterogeneous clusters are each based on a single heterogeneous cluster of the plurality of clusters.
(3) The method according to one of (1) or (2), further comprising selecting, for one or more of the heterogeneous clusters, a classification algorithm by evaluating one or more performance metrics of different classification algorithms based on the training transactions of the one or more heterogeneous clusters, the associated machine-learning models of the heterogeneous clusters being based on the selected classification algorithm.

(4) The method according to one of (1) to (3), wherein the plurality of training transactions are clustered using an unsupervised clustering technique.

(5) The method according to one of (1) to (4), wherein the plurality of training transactions are clustered using k-means clustering and/or using hierarchical clustering.

(6) The method according to one of (1) to (5), wherein a number of clusters generated in the clustering of the plurality of training transactions depends on the plurality of training transactions, the method comprising determining the number of clusters to be used in the clustering of the plurality of training transactions based on the plurality of training transactions.

(7) The method according to (6), wherein the number of clusters to be used in the clustering of the plurality of training transactions is determined using an iterative process that is performed over a range of numbers of clusters.

(8) The method according to one of (6) or (7), wherein the number of clusters to be used in the clustering of the plurality of training transactions is determined based on a trade-off between intra-cluster variance and inter-cluster variance of the clustering of the plurality of training transactions.

(9) The method according to one of (1) to (8), wherein the labelling information is disregarded in the clustering of the plurality of training transactions.

(10) The method according to one of (1) to (9), wherein the training transactions of the respective heterogeneous cluster are used as training samples and the associated labelling information is used as desired output in the training of the associated machine-learning model.

(11) The method according to one of (1) to (10), wherein the machine-learning system is based on using the labeling information associated with the training transactions of the homogeneous clusters in the classification of the transactions.

(12) The method according to one of (1) to (11), wherein the associated machine-learning models of the heterogeneous clusters are trained using a plurality of distributed compute nodes.

(13) A method for classifying a transaction as either fraudulent or genuine, the method comprising:
Assigning the transaction to a cluster of a plurality of clusters in accordance with a similarity measure, the plurality of clusters each being based on a plurality of training transactions in accordance with the similarity measure, each training transaction being associated with labelling information that indicates whether the training transaction is either genuine or fraudulent; and
Classifying the transaction as either fraudulent or genuine by using a machine-learning model that has been trained based on the training transactions of the cluster the transaction is assigned to if the cluster the transaction is assigned to is heterogeneous, a heterogeneous cluster including both fraudulent and genuine training transactions, and using the labelling information of the training transactions of the cluster the transaction is assigned to otherwise.

(14) A method for classifying a transaction as either fraudulent or genuine using a machine-learning system generated according to one of (1) to (12), the method comprising:
Assigning the transaction to the closest cluster in accordance with the similarity measure;
If the cluster to which the transaction is assigned is homogeneous, classifying the transaction in accordance with the labelling information of the training transactions of the cluster;
If the cluster to which the transaction is assigned is heterogeneous, classifying the transaction by means of the machine-learning model associated with the cluster.

(15) The method according to one of (13) or (14), wherein the transaction is assigned to a cluster based on a comparison of the transaction with a centroid or barycenter of the cluster.

(16) The method according to one of (13) to (15), wherein the transaction is classified as fraudulent or genuine without involving a machine-learning model if the cluster is homogenous, a homogeneous cluster including either only fraudulent or only genuine training transactions.

(17) The method according to one of (13) to (16), wherein the machine-learning model is selected for the classification of the transaction in a model selection procedure based on the cluster the transaction is assigned to if the cluster the transaction is assigned to is a heterogeneous cluster.

(18) The method according to one of (13) to (17), wherein the transaction is a financial transaction.

(19) The method according to one of (13) to (18), the method comprising selecting one or more training transactions from the cluster the transaction is assigned to using the similarity measure, and providing the one or more training transactions with the classification of the transaction.

(20) A computer program having a program code for performing at least one of the methods according to one of the previous claims, when the computer program is executed on a computer, a processor, or a programmable hardware component.

(21) An apparatus comprising circuitry, the circuitry being configured to execute at least one of the methods according to one of (1) to (19).

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method, comprising:
    selecting a plurality of training transactions, each training transaction being associated with labeling information that indicates whether the training transaction is either genuine or fraudulent;
    providing plural training transactions, of the plurality of training transactions, based on a similarity with a particular transaction to be classified;
    clustering the plural training transactions into a plurality of clusters, partitioning the plural training transactions into different clusters of the plurality of clusters based on a similarity measure;
    determining, for each cluster of the plurality of clusters, whether the cluster is a heterogeneous cluster, including both fraudulent and genuine training transactions, or is a homogeneous cluster including only fraudulent training transactions or including only genuine training transactions;
    for each respective heterogeneous cluster of the plurality of clusters, training a corresponding classification algorithm using training transactions belonging to the respective heterogeneous cluster;
    selecting, for one or more of the heterogeneous clusters, the classification algorithm by evaluating one or more performance metrics of different classification algorithms based on the training transactions of the one or more heterogeneous clusters; and
    assigning the particular transaction to a cluster of a plurality of clusters in accordance with a similarity measure;
    in a case that the particular transaction is assigned to a cluster that is a heterogeneous cluster including both fraudulent training transactions and genuine training transactions, classifying the particular transaction as either fraudulent or genuine by using the selected classification algorithm, which corresponds to the cluster the transaction is assigned to and that has been trained based on the training transactions of the cluster; and
    in a case that the particular transaction is assigned to a cluster that is a homogenous cluster including only fraudulent training transactions or including only genuine training transactions, using the labeling information of the training transactions of the cluster to classify the particular transaction.

2. The method according to claim 1, wherein the classification algorithms are each based on a single heterogeneous cluster of the plurality of clusters.

3. The method according to claim 1, wherein the plurality of training transactions are clustered using an unsupervised clustering technique.

4. The method according to claim 1, wherein the plurality of training transactions are clustered using k-means clustering and/or using hierarchical clustering.

5. The method according to claim 1, wherein
    a number of clusters of the plurality of clusters generated in the clustering is based on the plurality of training transactions, and
    the method further comprising determining the number of clusters to be used in the clustering.

6. The method according to claim 5, wherein the number of clusters is determined using an iterative process that is performed over a range of numbers of clusters.

7. The method according to claim 5, wherein the number of clusters is determined based on a trade-off between intra-cluster variance and inter-cluster variance of the clustering of the plurality of training transactions.

8. The method according to claim 1, wherein the labeling information is disregarded in the clustering of the plurality of training transactions.

9. The method according to claim 1, wherein the training transactions of the respective heterogeneous cluster are used as training samples and the associated labeling information is used as desired output in the training of the corresponding machine-learning model.

10. A non-transitory computer readable medium storing computer executable instructions which, when executed by processing circuitry, cause the processing circuitry to perform the method of claim 1.

11. An apparatus, comprising:
processing circuitry configured to
  select a plurality of training transactions, each training transaction being associated with labeling information that indicates whether the training transaction is either genuine or fraudulent;
  provide plural training transactions, of the plurality of training transactions, based on a similarity with a particular transaction to be classified;
  cluster the plural training transactions into a plurality of clusters, partitioning the plural training transactions into different clusters of the plurality of clusters based on a similarity measure;
  determine, for each cluster of the plurality of clusters, whether the cluster is a heterogeneous cluster, including both fraudulent and genuine training transactions, or is a homogeneous cluster including only fraudulent training transactions or including only genuine training transactions;
  for each respective heterogeneous cluster of the plurality of clusters, train a corresponding classification algorithm using training transactions belonging to the respective heterogeneous cluster;
  select, for one or more of the heterogeneous clusters, the classification algorithm by evaluating one or more performance metrics of different classification algorithms based on the training transactions of the one or more heterogeneous clusters; and
  assign the particular transaction to a cluster of a plurality of clusters in accordance with a similarity measure;
  in a case that the particular transaction is assigned to a cluster that is a heterogeneous cluster including both fraudulent training transactions and genuine training transactions, classify the particular transaction as either fraudulent or genuine by using the selected classification algorithm, which corresponds to the cluster the transaction is assigned to and that has been trained based on the training transactions of the cluster; and
  in a case that the particular transaction is assigned to a cluster that is a homogenous cluster including only fraudulent training transactions or including only genuine training transactions, use the labeling information of the training transactions of the cluster to classify the particular transaction.

12. The apparatus according to claim 11, wherein the processing circuitry is further configured to execute the classification algorithm to classify a transaction as fraudulent or genuine.

13. The apparatus according to claim 12, wherein the processing circuitry is configured to
  assign the transaction to a closest cluster of the plurality of clusters in accordance with the similarity measure;
  in a case that the closest cluster is homogeneous, classify the transaction in accordance with the labeling information of the training transactions of the cluster; and
  in a case that the closest cluster is heterogeneous, classify the transaction by utilizing the machine-learning model corresponding to the closest cluster.

14. The method according to claim 1, wherein the classification algorithm utilizes the labeling information of training transactions corresponding to the homogeneous clusters of the plurality of clusters in the classifying the transactions.

* * * * *